United States Patent [19]

Billingsley

[11] Patent Number: 5,236,479
[45] Date of Patent: Aug. 17, 1993

[54] CYCLONE SEPARATOR

[75] Inventor: John G. S. Billingsley, Newark, Del.

[73] Assignee: Precision Cutters, Inc., Phillipsburg, N.J.

[21] Appl. No.: 891,836

[22] Filed: Jun. 1, 1992

[51] Int. Cl.⁵ .......................................... B01D 45/12
[52] U.S. Cl. ...................................... 55/337; 55/429; 55/459.2
[58] Field of Search ................ 55/315, 337, 429, 430, 55/459.1, 459.2

[56] References Cited

U.S. PATENT DOCUMENTS

| | | | |
|---|---|---|---|
| 3,842,461 | 10/1974 | Wurster | 55/430 X |
| 4,149,861 | 4/1979 | Sogo et al. | 55/430 X |
| 4,318,721 | 3/1982 | Barr | 55/337 |
| 4,406,677 | 9/1983 | Obermeier | 55/315 |
| 4,490,162 | 12/1984 | Davis | 55/315 X |
| 4,848,990 | 7/1989 | Matsui | 55/429 X |

Primary Examiner—Charles Hart
Attorney, Agent, or Firm—Connolly and Hutz

[57] ABSTRACT

A cyclone separator for segregating a mixture of light and heavy particles from a gas stream carrying such particles includes a separating chamber connected at its upper end to a gas discharge chamber and connected at its lower end to a particle discharge chamber. A feed tube spirally wraps at least partially around the upper gas discharge chamber and communicates with the separating chamber to direct a stream containing the gas and particles into the separating chamber in a downward, radial direction. Some of the entering gas and some minute dust particles from the separating chamber exit through the gas discharge chamber and the balance of particles exit through the lower particle discharge chamber into a particle collector or bin. The separating chamber includes a section containing porous material through which a large percentage of entering gas can exit, thereby reducing the volume and velocity of gas exiting through the upper and lower discharge chambers. This separator achieves an improved separation of the gas from the mixture of light and heavy particles.

13 Claims, 3 Drawing Sheets

CYCLONE SEPARATOR

BACKGROUND OF INVENTION

There are various applications where it is desirable to separate a mixture of light and heavy particles conveyed in an air or gas stream, particularly in industrial applications involving dust mixed with heavier particles. In these applications cyclone type separators have been used with mixed success in separating out the conveyed particles. Generally such cyclone separators involve feeding a stream of air containing the particles into a cylindrical separating chamber where the particles migrate toward the wall of the cylinder and travel radially downward to the bottom thereof and the bulk of the entering air and some very light, dust-like particles are drawn up and out of the chamber with the exiting air stream. Cyclone separators of this type are described in Alden, Kane "Design of Industrial Ventilation Systems", Fifth Edition, pp. 142-148 Industrial Press 1982.

U.S. Pat. No. 3,367,090 discloses a cyclonic apparatus wherein the wall of the cyclone chamber is made from a non-porous elastomeric material that flexes in order to minimize particle buildup thereon. U.S. Pat. No. 1,056,552 discloses a dust collector wherein the vertical cyclone is made from a fabric material.

SUMMARY OF INVENTION

An object of this invention is to provide a more effective cyclone separator for segregating the conveyed particles from an entering air stream.

It is a further object of this invention to provide an improved separation of gas from the conveyed mixture of light and heavy particles.

A further object of this invention is to provide such a cyclone separator which has particular utility for use in an adhesive detackification system.

In accordance with this invention the cyclone separator includes a separating chamber connected at its upper end to a gas discharge chamber and connected at its lower end to a particle discharge chamber. A feed tube spirally wraps at least partially around the gas discharge chamber and directs a stream of gas containing a mixture of light and heavy particles into the separating chamber in a high velocity downward, radial direction. The wall of the separating chamber is made from a porous material which is scrubbed by the downward, radial passage of the particles across that material. Gas passes through the porous wall of the separating chamber thereby dramatically reducing the volume of air leaving through the upper and lower discharge chambers connected to the separating chamber.

The amount of air passing through the porous wall versus the upper and lower discharge chambers can be advantageously adjusted by increasing the area of the porous wall. Thus it is possible to accommodate large variations in entering gas volume by simple adjustments in the diameter of the separating chamber. An increase in diameter will increase the area of gas outflow through the porous wall of the separating chamber. Conversely, a decrease in diameter will reduce the outflow in those applications involving lower volumes of entering gas-particle streams.

This flexibility permits a reduction in the amount of velocity of gas exiting the upper and lower discharge chambers connected to the separating chamber. Reduced flow of gas through the upper discharge chamber is particularly desired in order to minimize the amount of particulate matter exiting through that opening, the object being to maximize particulate separation from the gas and removal through the lower discharge chamber or opening. Similarly, reduction in exit gas flow and velocity through the lower particle discharge chamber is desirable to minimize the amount of light particle dispersion (dust) that might be created by a fast moving stream of gas impinging upon light particles in a collecting chamber or hopper below the opening of the lower discharge chamber.

In a preferred practice of the invention an elongated cylindrical sleeve surrounds, and is radially spaced from, the gas discharge chamber with both the sleeve and gas particle discharge chamber extending into the separating chamber. The feed tube communicates with and terminates in the area between the gas discharge chamber and the sleeve. The sleeve is preferably mounted to a horizontal imperforate circular upper plate which forms the upper surface of the separating chamber.

The feed tube may initially be of circular cross-section and may terminate in a chute of rectangular cross-section where it communicates with the area between the gas discharge chamber and the sleeve. A transition portion extends between the circular cross-section portion and the rectangular cross-section portion.

A fan chamber may communicate with a vertically movable hood which can be disposed closer to or further from the exit end of the gas discharge chamber. The particle discharge chamber is preferably funnel or frusto-conically shaped with a circular wall at its upper end.

THE DRAWINGS

DETAILED DESCRIPTION

Figure 1:
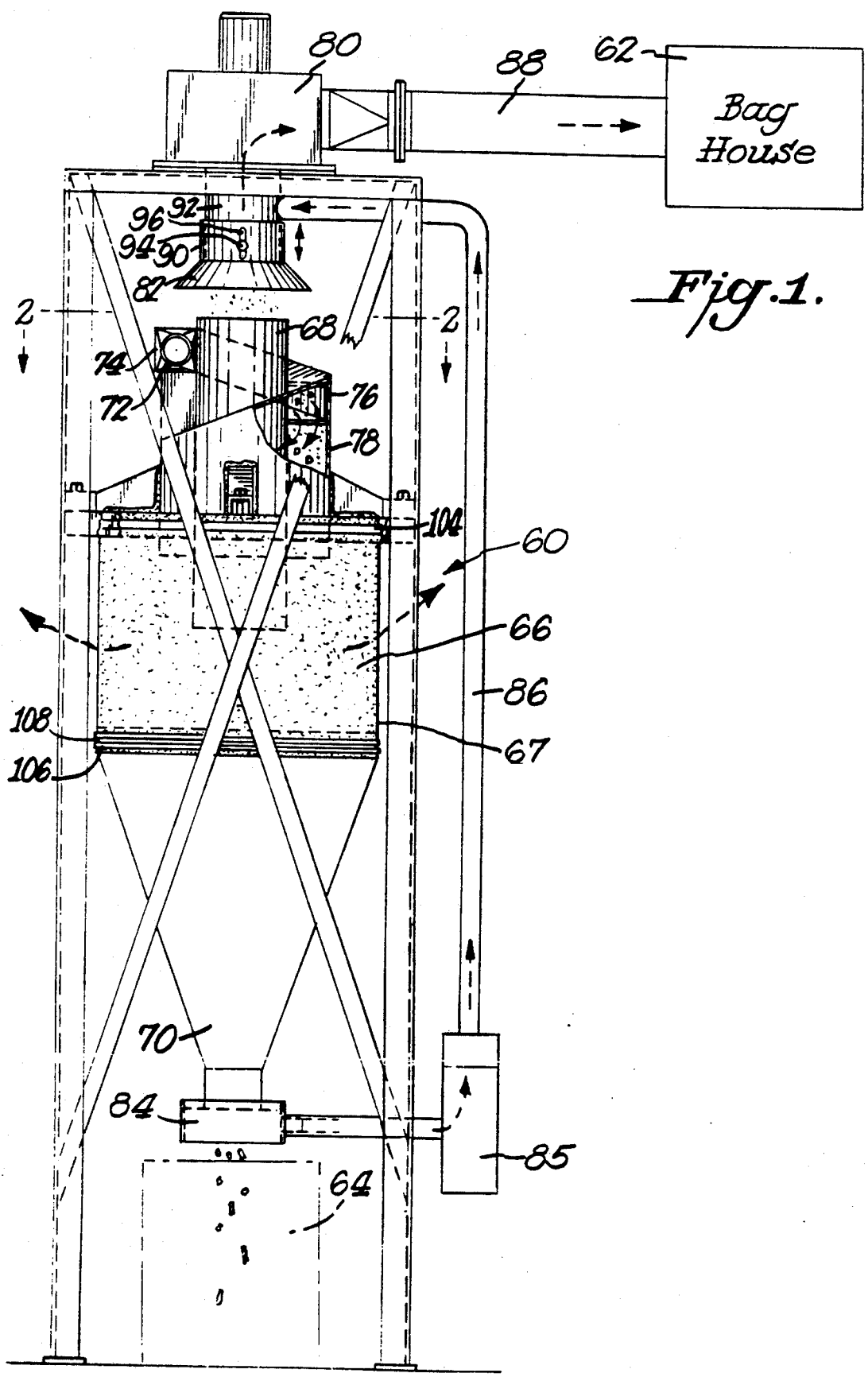
FIG. 1 is an elevational view partly in section of a cyclone separator in accordance with this invention.
Figure 2:
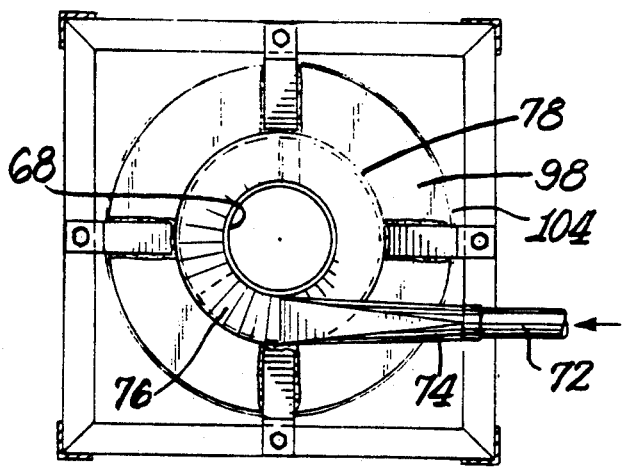
FIG. 2 is a cross-sectional view taken through FIG. 1 along the line 2—2.

FIGS. 1-4 illustrate the details of separator 60 in accordance with this invention. In general, separator 60 is a cyclone separator which operates under the principle of centrifugal force wherein the bulk of light and heavy particles entering the separator 60 are separated from the entering gas and are discharged into a collecting bin 64. Any minute dust particles carried by gas exiting the top of the separator are collected in a collector or bag house 62.

Separator 60 includes a main cylindrical separating chamber 66 which will be discussed in greater detail. A gas discharge chamber 68 extends into and communicates with the interior of separating chamber 66. The lower portion of chamber 68 disposed within chamber 66 may be a perforated cylinder. A funnel shaped lower particle discharge chamber 70 is connected to and communicates with the interior of separating chamber 66.

Figure 3:
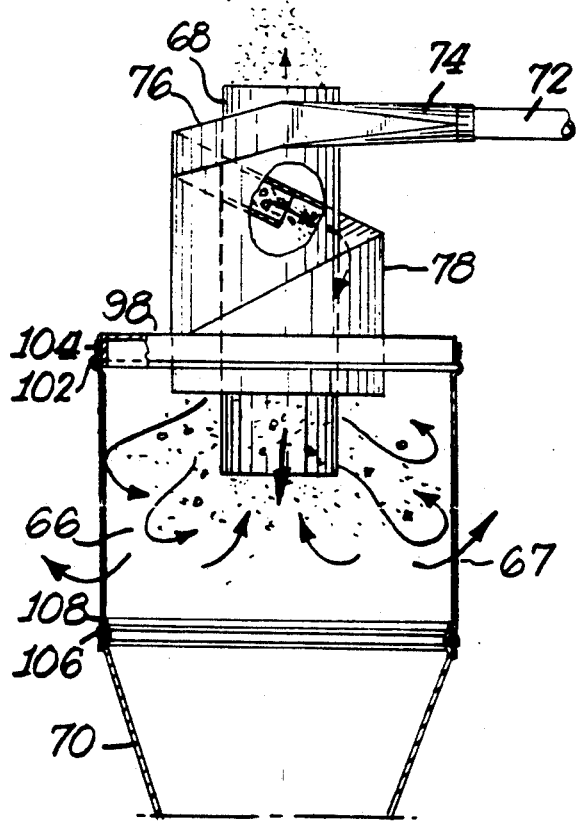
FIG. 3 is a left side elevational view partly in section of a portion of the cyclone separator shown in FIGS. 1-2.
Figure 4:
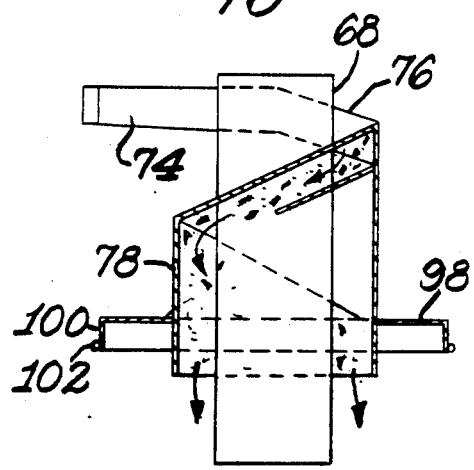
FIG. 4 is a right side elevational view partly in section of the cyclone separator shown in FIGS. 1-3.

A mixture of gas (usually air), and a range of very light dust to heavy particles is conveyed into a feed tube 72 of generally circular cross-section. As shown in FIG. 3, feed tube 72 is connected to a transition section 74 wherein the cross-section of the feed tube changes from a circular cross-section to a rectangular cross-section at feed chute 76. Feed chute 76 spirally wraps around chamber 68 and communicates with an annular sleeve 78 spaced from and substantially surrounding gas discharge chamber 68. The spiral wrap of feed chute 76 extends about 180° around chamber 68 thereby imparting a downward, spiral velocity to the mixture of gas, and light to heavy particles entering separating chamber 66 as illustrated in FIG. 3.

The provision of a porous media cylinder wall 67 for chamber 66 permits much of the gas within chamber 66 to pass through wall 67. This substantially reduces the volume and velocity of gas leaving separator 60 through the upper and lower discharge chamber openings. The inside surface of the porous media 67 is constantly scrubbed by the rapidly rotating, downwardly directed heavy particles exiting the spiral chute 76. This prevents or minimizes the buildup of dust or particles on the inside surface of porous media 67 which would otherwise reduce gas transmissibility through the porous media 67. Without this scrubbing action imparted by spiral chute 76 the porous media 67 will quickly become partially or wholly plugged with dust thereby impairing operation of the separator 60.

Most of the particles as well as some dust and gas leave the separator 66 through the opening at the bottom of the discharge cone 70. The pneumatic pickup ring 84 located at the lower discharge chamber opening carries away any dust laden gas that is moving upwards, out of the particle collection bin 64 because of turbulence. Such dust laden air is conveyed through tube 86 by centrifugal fan 85 into passageway 92 and then through fan chamber 80 and finally into bag house 62 through tube 88.

The balance of entering gas and some unavoidable portion of minute dust particles left in the separator are discharged from the top of separating chamber 66, through discharge chamber 68 into the area of influence of the fan chamber 80 which conveys the dust and gas into the adjacent pulse filter bag separator or bag house 62. The dust is discharged from separator or bag house 62 through a star valve into a recovery bin for disposal or recycling. Fan 80 communicates with chambers 66 and 68 through axially aligned hood 82.

One of the features of separator 60 is the vertically adjustable mounting of fan hood 82. Any suitable means may be used for this adjustable mounting. As shown, for example, in FIG. 1 the fan hood 82 includes a cylindrical portion 90 which telescopes over tube 92. A fastener 94 on tube 92 extends through slot 96 in cylindrical portion 90 to permit the hood to be raised or lowered. Any suitable number of fasteners and slots may be used.

As illustrated in FIG. 3, an imperforate top wall or plate 98 covers separating chamber 66. Wall 98 has a central opening through which sleeve 78 and gas discharge chamber 68 penetrate whereby the sleeve 78 and discharge chamber 68 extend into the interior of separator chamber 66.

Advantageously the porous media cylindrical wall 67 of separator chamber 66 is detachably mounted should it be necessary to replace or change the porous media 67. Any suitable means of detachable mounting may be used. In the illustrated embodiment (FIGS. 3-4) top wall 98 includes a peripheral downwardly extending flange 100 with a peripheral lip 102. The upper edge of porous media 67 is disposed over lip 102 against peripheral wall 100 and detachably mounted in place by, for example, a tightening band 104 of any suitable construction. Similarly, the lower end of the porous media 67 of separating chamber 66 may be detachably mounted to the cone-like discharge chamber 70. In the illustrated embodiment the funnel shaped discharge chamber 70 includes an upwardly extending rigid cylindrical wall 106 having a channel 108. The porous material of separating chamber 66 is disposed over the cylindrical portion 106 of discharge chamber 70 and detachably mounted in place by a tightening band located at channel 108 with the porous material therebetween.

The dimensions for separator 60 may be chosen to maximize operations. As previously described the size of the separating chamber 66 can be adjusted to accommodate the volume of entering gas. The larger the volume of entering gas the greater the diameter of separating chamber 66 and vice versa. Typical dimensions of other components of separator 60 are as follows. Circular feed tube 72 may be a five inch diameter. The length of transition section 74 may be twenty-four inches and terminate in chute 76 that can vary in height and width depending upon volume of entering gas flow. Sleeve 78 may have a diameter of twenty-five inches while the diameter of gas outlet cylinder 68 may be fourteen inches. The overall height of separating chamber 66 may be 32 inches and its diameter varied as noted above. Discharge chamber 70 may have an axially length of 55½ inches. The lower portion of gas outlet chamber 68 may be solid or perforated. The perforations assist in the exit of gas through the outlet. Any suitable material may be used as the porous media for separating chamber 66. A preferred material is a non-woven felt made from a polyester material typically having a pore size ranging from 1-50 microns with a flow rating of 40-200 cfm per square foot at ½ inch water pressure.

Separator 60 has a number of distinct features. The spiral inlet provided by chute 76 functions to confine and control the inlet velocity and direction of the particles entering separator chamber 66. The spiral confined path within chute 76 contributes to the downward velocity of the entering stream of gas and particles and drives the particles around the periphery of the inside wall of porous media 67. This velocity overcomes static charges which might otherwise tend to make the particles stick to the chamber wall. The high downward, radial velocity component also acts on the heavy particles in the entering gas stream to force them across the inside surface of porous media 67 in a manner which scrubs off dust accumulated thereon. This enables the pores in the media 67 to remain open thereby maximizing the amount of gas leaving separating chamber 66, and preventing blockage or clogging of the media 67. Blockage of media 67 would adversely affect the operation of separating chamber 66 by unduly increasing the amount and velocity of gas passing through the upper and lower discharge chambers 68 and 70. These higher velocities adversely affect the separation of the gas from the conveyed particles as previously explained.

In the preferred practice of this invention the cross section of chute 76 is rectangular. It is to be understood, however, that other forms of cross sections such as square, oval, circular, etc. may also be used within the broad concepts of this invention. Similarly, the invention is preferably practiced with chute 76 spirally wrapping around chamber 68 for at least 180°. The invention however, may also be practiced where the amount of spiral wrap is more or less than 180°. A spiral wrap is desired in order to provide a high spin rate and downward velocity to the particles.

A further advantageous feature of separator 60 is the ability to provide a substantially clean room in which the separator is housed. This is accomplished by the provision of the pneumatic pickup ring 84 described above and the fan in chamber 80 which helps trap gas and light particles, such as dust, which might otherwise tend to enter the atmosphere through the upper or lower discharge chambers. The fan in chamber 80 may be of any suitable form, but is preferably a centrifugal fan. Separator 60 is particularly effective for treating air having dust and heavy particles as distinguished from air and dust alone. The particles collected in, for example, bin 64 might be recycled for later use.

Figure 5:
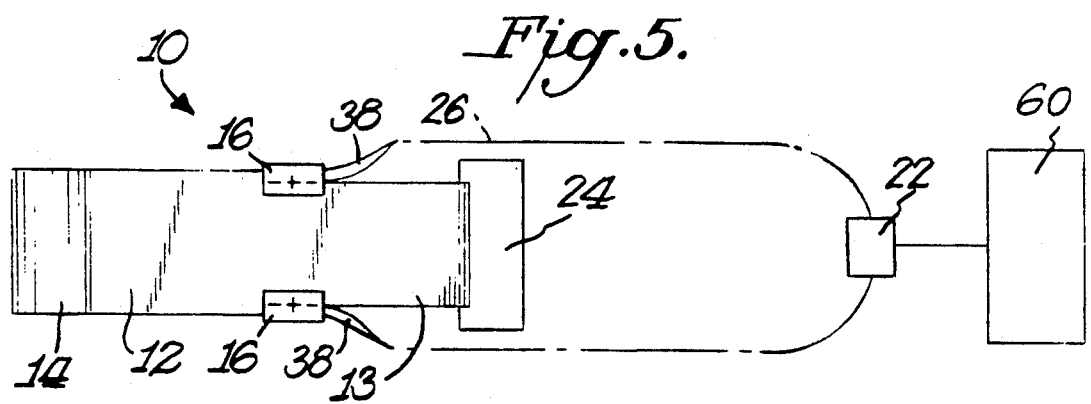
FIG. 5 is a schematic view of a system for cutting adhesive tape which includes the cyclone separator of FIGS. 1-4.

Separator 60 may be used in numerous applications. FIG. 5, for example, illustrates one application where separator 60 is included in a detackification system 10. As shown therein the detackification system 10 includes a strip of adhesive coated material 12 which is fed from roll 14 toward take up roll 24. FIG. 5 schematically shows the provision of a pair of cutters 16,16 which are spaced apart the desired distance of the finished roll of adhesive tape 24. Thus, cutters 16,16 cut a margin of tape 38 from each side of the initially fed tape 12 leaving an intermediate portion which would be wound on collector or take up roll 24. The trim 38 created by each cutter 16 is pneumatically conveyed to a suitable cutter 22 which cuts the trim into discrete lengths of, for example, 1-2 inches.

In a novel detackification system, powder is applied to the tape at the cutting station 16 and the powdered tape pneumatically conveyed to a cutter 22 where the two side strips are cut into discrete lengths. Separator 60 is then used to separate the powder and powdered tape from the air used to pneumatically convey the tape.

It is to be understood that although separator 60 is particularly advantageous for incorporation in a detackification system, such as in system 10, separator 60 may be used wherever it is desirable to separate a mixture of light and or heavy particles from a gas.

What is claimed is:

1. A separator for separating particles from a large volume of gas comprising a separating chamber, an upper gas discharge chamber mounted above said separating chamber and extending into and in flow communication with said separating chamber, a lower particle discharge chamber mounted below said separating chamber in flow communication with said separating chamber, feed means leading into and communicating with said separating chamber for directing a stream of gas containing light and heave particles in a downward direction in said separating chamber, said feed means confining the stream and directing the stream spirally and imparting a spin velocity and downward velocity component to the particles, and said separating chamber including a vertical wall made from a non-woven porous material having a pore size of about 1-50 microns through which gas may be externally released to reduce the volume of gas leaving said separating chamber through said upper and lower discharge chambers.

2. The separator of claim 1 wherein said feed means includes a sleeve mounted concentrically around said upper gas discharge chamber, and a feed tube communicating with said sleeve.

3. The separator of claim 2 wherein said sleeve and said gas discharge chamber extend into said separating chamber through an opening in an otherwise closed upper wall of said separating chamber.

4. The separator of claim 3 wherein said feed means includes a spiral, downwardly directed chute in the annular space between said sleeve and upper gas discharge chamber.

5. The separator of claim 4 wherein said feed means spirally extends around said gas discharge chamber for at least about 180°.

6. The separator of claim 1 including pneumatic means mounted at the lower end of said lower particle discharge chamber for conveying light particles to a closed collection means.

7. The separator of claim 6 including a fan chamber having a hood disposed coaxially above and spaced from said upper gas discharge chamber, and adjustable mounting means for vertically adjusting the spacing of said hood from said upper gas discharge chamber.

8. The separator of claim 7 wherein said lower particle discharge chamber is funnel shaped, and said sleeve, gas discharge chamber and said separating chamber are cylindrically shaped.

9. The separator of claim 8 wherein said pneumatic means is an pneumatic pickup ring mounted at the outlet of said funnel shaped discharge chamber and in flow communication with said fan chamber for conveying light particles to said fan chamber.

10. The separator of claim 9 wherein said light particle collection means comprises a pulsed filter bag.

11. The separator of claim 1 wherein the upper portion of said separating chamber includes a downwardly extending peripheral flange, said lower discharge chamber having an upwardly extending cylindrical wall, said porous material being disposed over said peripheral flange and over said cylindrical wall, and detachable mounting means mounting said porous material to said peripheral wall and to said cylindrical wall.

12. The separator of claim 11 in combination with feed means for feeding cut adhesive coated strips and powder to said separator.

13. A separator for separating a mixture of light and heavy particles from a large volume of gas comprising a separating chamber, an upper gas discharge chamber mounted above said separating chamber and extending into and in flow communication with said separating chamber, a lower particle discharge chamber mounted below said separating chamber in flow communication with said separating chamber, feed means leading into and communicating with said separating chamber for directing a stream of gas containing light and heavy particles in a radially downward direction into said separating chamber, particle collection means mounted below and in flow communication with said particle discharge chamber, said gas discharge chamber being a discharge tube extending partially into said separating chamber and partially out of said separating chamber and being coaxial with said separating chamber, a fan chamber disposed coaxially above said discharge tube for removal of any light particles exiting the discharge tube, an adjustable fan inlet hood mounted to said fan chamber coaxially above said discharge tube, said lower particle discharge chamber being funnel shaped with an enlarged feed end mounted coaxially with said separating chamber and a narrow outlet end remote from and coaxially below said separating chamber, a pneumatic pickup ring mounted to said outlet end of said lower particle discharge chamber, a passageway in flow communication with said pickup ring and said fan chamber, and a centrifugal fan in said passageway whereby light particles adjacent said pneumatic pickup are conveyed to said fan chamber for minimizing entry of any light particles into the environment around said separator.

* * * * *

UNITED STATES PATENT AND TRADEMARK OFFICE
CERTIFICATE OF CORRECTION

PATENT NO. : 5,236,479
DATED : August 17, 1993
INVENTOR(S) : John G.S. BILLINGSLEY, ET AL It is certified that error appears in the above-indentified patent and that said Letters Patent is hereby corrected as shown below:

Column 5, line 53  change "heave" to -- heavy --

Signed and Sealed this

Fourteenth Day of June, 1994

Attest:

BRUCE LEHMAN

Attesting Officer    Commissioner of Patents and Trademarks